(12) United States Patent
Ogimura et al.

(10) Patent No.: US 10,077,704 B2
(45) Date of Patent: Sep. 18, 2018

(54) CATALYTIC CONVERTER

(71) Applicant: TOYOTA JIDOSHA KABUSHIKI KAISHA, Toyota-shi, Aichi (JP)

(72) Inventors: Shoji Ogimura, Toyota (JP); Hiroshi Tanaka, Susono (JP); Hideyuki Komitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/910,520

(22) PCT Filed: Dec. 11, 2014

(86) PCT No.: PCT/JP2014/083504
§ 371 (c)(1),
(2) Date: Feb. 5, 2016

(87) PCT Pub. No.: WO2015/098674
PCT Pub. Date: Jul. 2, 2015

(65) Prior Publication Data
US 2016/0290209 A1    Oct. 6, 2016

(30) Foreign Application Priority Data

Dec. 26, 2013    (JP) .................................. 2013-269885

(51) Int. Cl.
*F01N 3/10*    (2006.01)
*F01N 13/00*    (2010.01)
(Continued)

(52) U.S. Cl.
CPC ........... *F01N 13/0097* (2014.06); *F01N 3/10* (2013.01); *F01N 3/2013* (2013.01); *F01N 3/2026* (2013.01); *F01N 3/2839* (2013.01); *F01N 3/2853* (2013.01); *F01N 3/2864* (2013.01); *F01N 13/009* (2014.06); *F01N 2240/16* (2013.01); *F01N 2250/04* (2013.01); *F01N 2250/06* (2013.01); *F01N 2350/02* (2013.01);
(Continued)

(58) Field of Classification Search
CPC .... F01N 3/2013; F01N 3/2016; F01N 3/2864; F01N 3/2853; F01N 13/009; F01N 13/0097; F01N 2570/10
USPC .................................................. 422/171, 179
See application file for complete search history.

(56) References Cited

U.S. PATENT DOCUMENTS 5,829,132 A * 11/1998 Sickels ................ B23P 11/005
                                                                29/505
6,112,519 A     9/2000 Shimasaki et al.
(Continued)

FOREIGN PATENT DOCUMENTS

EP           2559487 A1    2/2013
JP         H11-257063 A    9/1999
(Continued)

*Primary Examiner* — Tom P Duong
(74) *Attorney, Agent, or Firm* — Oliff PLC

(57) ABSTRACT

In a catalytic converter having a catalyst support that generates heat by being energized, short circuiting due to soot within exhaust is suppressed. A catalyst support is provided in a range of a glass coat layer that is provided on an inner surface of a tube body. A maximum diameter portion of an upstream side reduced diameter member and a maximum diameter portion of a downstream tube are positioned in the range of the glass coat layer.

2 Claims, 5 Drawing Sheets

(51) Int. Cl.
*F01N 3/20* (2006.01)
*F01N 3/28* (2006.01)

(52) U.S. Cl.
CPC ...... *F01N 2470/20* (2013.01); *F01N 2470/24* (2013.01); *F01N 2570/10* (2013.01); *F01N 2570/12* (2013.01); *Y02T 10/26* (2013.01)

(56) References Cited

U.S. PATENT DOCUMENTS

| | | |
|---|---|---|
| 2012/0011834 A1 | 1/2012 | Sobue |
| 2013/0022513 A1 | 1/2013 | Yoshioka et al. |
| 2013/0336847 A1 | 12/2013 | Yoshioka |

FOREIGN PATENT DOCUMENTS

| | | |
|---|---|---|
| JP | 2012-021488 A | 2/2012 |
| JP | 2013-185573 A | 9/2013 |
| JP | 2015086783 A | 5/2015 |
| WO | 2011128996 A1 | 10/2011 |
| WO | 2012/120680 A1 | 9/2012 |

* cited by examiner

CATALYTIC CONVERTER

TECHNICAL FIELD

The present invention relates to a catalytic converter that is provided at the exhaust pipe of an internal combustion engine.

BACKGROUND ART

In a catalytic converter that is provided at an exhaust pipe in order to purify exhaust generated at an internal combustion engine, there is a structure in which an EHC unit that generates heat by being energized is disposed at an upstream side, and a catalytic converter unit is provided at the downstream side thereof, as described in Japanese Patent Application Laid-Open (JP-A) No. 11-257063 for example.

In a catalytic converter that is equipped with a catalyst support that generates heat by being energized, when soot within the exhaust adheres to the inner surface of a tube body, there is the concern that the electricity supplying members for supplying electricity to the catalyst support will short circuit due to this soot. For example, even if an insulating layer is provided between the tube body and the catalyst support, if soot accumulates so as to cover the entirety of this insulating layer, there is the concern that the above-described short circuiting will arise.

SUMMARY OF INVENTION

Technical Problem

In consideration of the above-described circumstances, the subject of the present invention is to suppress short circuiting due to soot within exhaust, in a catalytic converter that is equipped with a catalyst support that generates heat by being energized.

Solution to Problem

A first aspect of the present invention provides a catalytic converter including: a tube body that is formed in a tube shape and forms a portion of a flow path of exhaust; an insulating layer that is provided at an inner surface of the tube body; a catalyst support that is provided at an interior of the tube body in a range of the insulating layer, and that supports a catalyst for purifying exhaust discharged from an internal combustion engine, and whose temperature is raised due to the catalyst support being energized; an upstream side combustion member of which a region, that is nearest to an inner periphery of the tube body, is positioned in the range of the insulating layer and further toward an upstream side of the exhaust than the catalyst support, and that burns soot, within the exhaust, that has adhered to the upstream side combustion member; and a downstream side combustion member of which a region, that is nearest to the inner periphery of the tube body, is positioned in the range of the insulating layer and further toward a downstream side of the exhaust than the catalyst support, and that burns soot, within the exhaust, that has adhered to the downstream side combustion member.

In this catalytic converter, when the catalyst support is heated and the temperature thereof is raised by being energized, the purifying effect by the supported catalyst is exhibited better as compared with a case in which the temperature is not raised.

The upstream side combustion member is provided further toward the upstream side of the exhaust than the catalyst support. At the upstream side of the catalyst support, soot that has adhered to the upstream side combustion member is burned. Further, the downstream side combustion member is provided further toward the downstream side of the exhaust than the catalyst support. At the downstream side of the catalyst support, soot that has adhered to the downstream side combustion member is burned. Because soot is burned at the upstream side and the downstream side of the catalyst support, short circuiting, due to soot, between electricity supplying members that are for supplying electricity to the catalyst support for example is suppressed.

The insulating layer is provided at the inner surface of the tube body, and the catalyst support is provided within the tube body in the range of the insulating layer. Moreover, at the upstream side combustion member, the region thereof that is nearest to the inner periphery of the tube body is positioned in the range of the insulating layer, and, at the downstream side combustion member, the region thereof that is nearest to the inner periphery of the tube body is positioned in the range of the insulating layer. Accordingly, even if soot accumulates at the catalyst support, the upstream side combustion member and the downstream side combustion member, soot contacting the tube body is suppressed.

Moreover, even in a case in which soot accumulates so as to cover the insulating layer at the upstream side of the catalyst support, at the upstream side combustion member, the region thereof that is nearest to the inner periphery of the tube body is positioned in the range of the insulating layer, and therefore, the soot that covers the insulating layer can be burned by the heat of the upstream side combustion member. Similarly, even in a case in which soot accumulates so as to cover the insulating layer at the downstream side of the catalyst support, at the downstream side combustion member, the region thereof that is nearest to the inner periphery of the tube body is positioned in the range of the insulating layer, and therefore, the soot that covers the insulating layer can be burned by the heat of the downstream side combustion member. By burning the soot that covers the insulating layer at the upstream side and the downstream side of the catalyst support, short circuiting that is due to soot can be suppressed more effectively.

In a second aspect of the present invention, in the first aspect, the upstream side combustion member is an upstream tube that is formed in a tube shape and whose diameter decreases toward an upstream side.

The upstream tube is formed in a tube shape, and the diameter thereof is decreased toward the upstream side. Therefore, it is easy for the upstream tube to receive heat from the exhaust and for the temperature thereof to rise, and combustion of the adhered soot can be promoted.

In a third aspect of the present invention, in the first or second aspect, the downstream side combustion member is a downstream support that supports a catalyst for purifying the exhaust.

Because the downstream support supports a catalyst for purifying the exhaust, in addition to soot being burned, the exhaust can be purified by the catalyst.

Advantageous Effects of Invention

Because the present invention is structured as described above, short circuiting due to soot within exhaust can be suppressed in a catalytic converter that has a catalyst support that is heated by being energized.

DESCRIPTION OF EMBODIMENTS

Figure 1:
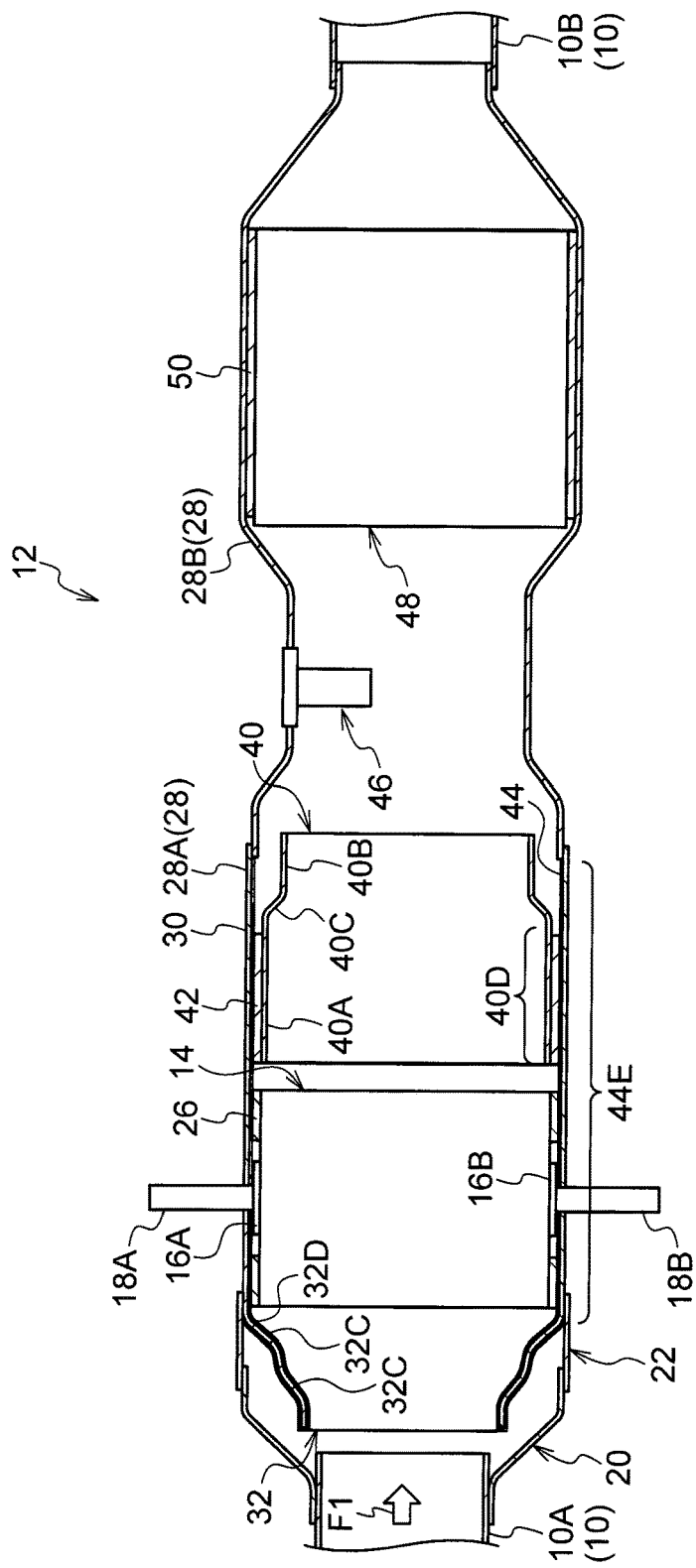
FIG. 1 is a cross-sectional view showing a catalytic converter of a first embodiment of the present invention in a state of being mounted to an exhaust pipe, in a cross-section that includes a center line.

A catalytic converter 12 of a first embodiment of the present invention is shown in FIG. 1 in a state of being installed at an exhaust pipe 10. In the following description, when merely "upstream side" and "downstream side" are used, they mean the upstream side and the downstream side, respectively, in the direction of flow of exhaust within the exhaust pipe 10 (the arrow F1 direction). The catalytic converter 12 is mounted between an upstream side exhaust pipe 10A and a downstream side exhaust pipe 10B.

As shown in FIG. 1, the catalytic converter 12 has a catalyst support 14 that is formed of a material that is electrically conductive and is rigid. Electrically conductive ceramics, electrically conductive resins, metals and the like can be used as the material that structures the catalyst support 14, and, in the present embodiment, the material is an electrically conductive ceramic in particular.

The catalyst support 14 is formed in a cylindrical shape or a cylindrical tube shape at which the surface area of the material is enlarged by structuring a thin plate, that is honeycomb-shaped or wave-shaped or the like, in a spiral form or in the form of concentric circles or the like. A catalyst (platinum, palladium, rhodium, or the like) is adhered to and supported at the surface of the catalyst support 14.

The catalyst has the effect of purifying substances (hydrocarbons and the like) within the exhaust that flows within the exhaust pipe 10. Note that the structure for increasing the surface area of the catalyst support 14 is not limited to the aforementioned honeycomb shape and wave shape.

Two electrodes 16A, 16B are affixed to the catalyst support 14, and moreover, terminals 18A, 18A are connected to the electrodes 16A, 16B respectively. The electrodes 16A, 16B and the terminals 18A, 18B are examples of energy supplying members for supplying energy to the catalyst support 14. The catalyst support 14 can be heated by being energized from the terminals 18A, 18B through the electrodes 16A, 16B to the catalyst support 14. By raising the temperature of the catalyst, that is supported on the surface, due to this heating, the purifying action of the catalyst can be exhibited better.

The catalyst support 14 is held in a state of being accommodated at the interior of a tube body 28 via a holding mat 26 that is disposed at the outer periphery of the catalyst support 14. The holding mat 26 is formed in a fibrous form that is insulating and has a predetermined elasticity from, for example, an alumina mat, a resin mat, ceramic wool, Interam mat, mullite, or the like.

In the present embodiment, the tube body 28 is molded from a metal such as stainless steel or the like, and an upstream tube body 28A at the upstream side and a downstream tube body 28B at the downstream side are connected such that the tube body 28 is formed in a substantially cylindrical tube shape on the whole. The tube body 28 forms a portion of the flow path of the exhaust between the upstream side exhaust pipe 10A and the downstream side exhaust pipe 10B.

The upstream side tube body 28A has a housing tube 30 that is cylindrical tube shaped and has a constant diameter from the upstream side to the downstream side, and an upstream side reduced diameter portion 32 (upstream side combustion member) that is connected to the upstream side from the upstream end of the housing tube 30 and whose diameter is reduced in a stepwise manner. Namely, the upstream side reduced diameter portion 32 is positioned further toward the upstream side than the catalyst support 14 and further toward the downstream side than the upstream side exhaust pipe 10A.

The upstream side reduced diameter portion 32 is an example of the upstream tube in the present invention. In the example shown in FIG. 1, the upstream side reduced diameter portion 32 has its diameter reduced in two steps at two reduced diameter portions 32C, but the number of the reduced diameter portions 32C may be one or may be three or more.

Because the upstream side reduced diameter portion 32 is a shape whose diameter is reduced toward the upstream side in this way, the region thereof that is furthest toward the downstream side is a maximum diameter portion 32D that is the largest diameter at the upstream side reduced diameter portion 32. Namely, the maximum diameter portion 32D is the region, at the upstream side reduced diameter portion 32 (the upstream tube), that is nearest to the inner peripheral surface of the housing tube 30.

An upstream side conical member 20 and a connecting member 22 are connected between the upstream side exhaust pipe 10A and the housing tube 30 of the upstream tube body 28A. The diameter of the upstream side conical member 20 increases from the downstream side toward the upstream side. The connecting member 22 is a cylindrical tube shaped member.

A glass coat layer 44 is provided at the inner surface of the housing tube 30. The glass coat layer 44 contains an inorganic substance such as a ceramic or the like, and is electrically insulating. This glass coat layer 44 is an example of the insulating layer in the present invention.

A formation range 44E of the glass coat layer 44 (range of the insulating layer) at the housing tube 30 is a predetermined range of the inner peripheral surface of the housing tube 30 that is the entire range thereof in the peripheral direction and is continuous in the direction of flow of the exhaust (substantially the entire range in the direction of flow in the example illustrated in FIG. 1). By providing this glass coat layer 44, soot within the exhaust does not contact the inner surface of the housing tube 30.

Figure 2:
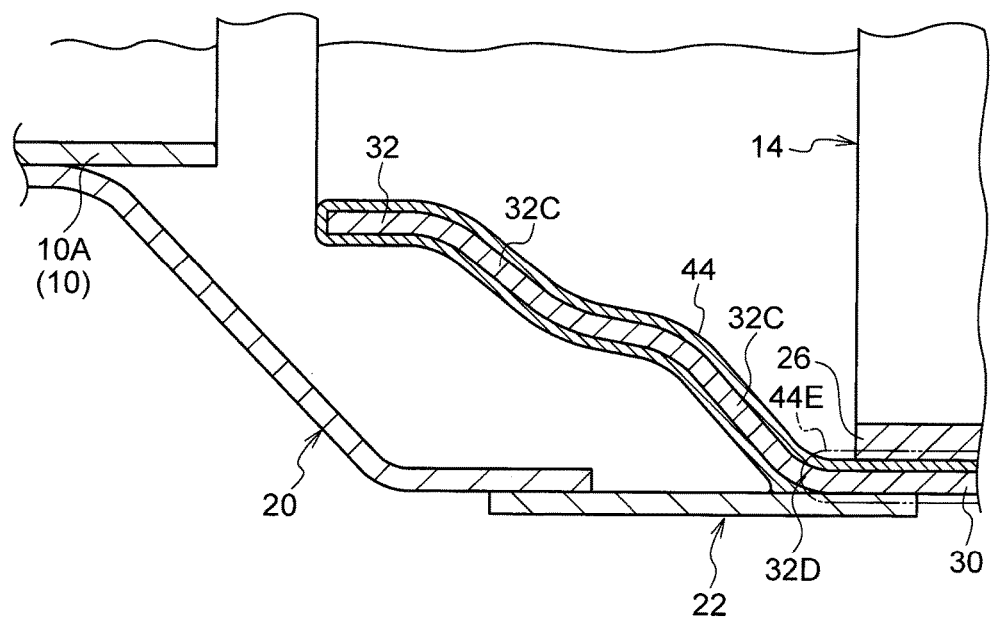
FIG. 2 is a cross-sectional view showing, partially and in an enlarged manner, the catalytic converter of the first embodiment of the present invention.

Moreover, in the present embodiment, as can be understood from FIG. 1 and FIG. 2, the glass coat layer 44 is formed in a range from the inner peripheral surface of the housing tube 30 over the inner peripheral surface of the upstream side reduced diameter portion 32 and reaching the outer peripheral surface thereof (substantially the entire surface of the upstream side reduced diameter portion 32). As can be understood from FIG. 2, the maximum diameter portion 32D of the upstream side reduced diameter portion 32, i.e., the region that is nearest to the inner peripheral surface of the housing tube 30, is positioned in the formation range 44E of the glass coat layer 44 at the housing tube 30.

A downstream tube 40 (downstream side combustion member) is provided at the downstream side of the catalyst support 14 within the housing tube 30 of the tube body 28. The downstream tube 40 is separated toward the downstream side from the catalyst support 14, and has a first cylindrical tube portion 40A whose diameter is slightly smaller than that of the housing tube 30 of the tube body 28, and a second cylindrical tube portion 40B that is continuous with the first cylindrical tube portion 40A at the downstream side thereof via a downstream side reduced diameter portion 40C and whose diameter is smaller than that of the first cylindrical tube portion 40A. In the example illustrated in FIG. 1, the diameter of the downstream tube 40 is reduced in one step by the downstream side reduced diameter portion 40C at one place, but the diameter may be reduced in two or more steps.

Figure 3:
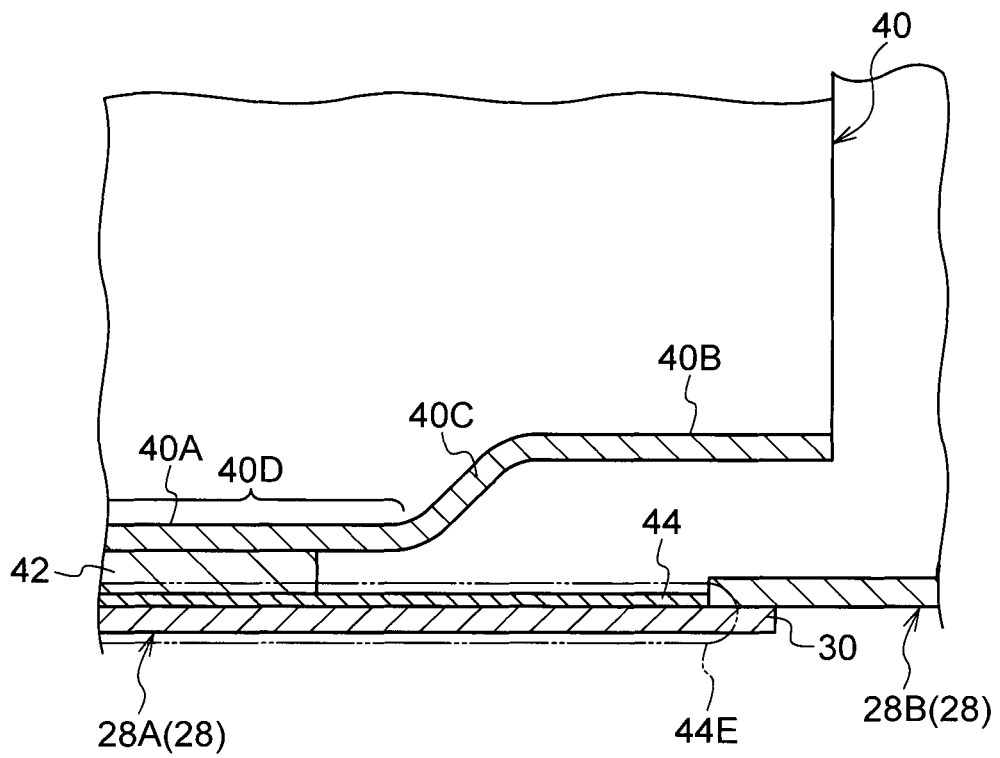
FIG. 3 is a cross-sectional view showing, partially and in an enlarged manner, the catalytic converter of the first embodiment of the present invention.

The first cylindrical tube portion 40A of the downstream tube 40 is a maximum diameter portion 40D whose diameter is the largest at the downstream tube 40. The maximum diameter portion 40D is the region, that is nearest to the inner peripheral surface of the housing tube 30, at the downstream tube 40. As can be understood from FIG. 3, the maximum diameter portion 40D of the downstream tube 40, i.e., the region that is nearest to the inner peripheral surface of the housing tube 30, is positioned in the formation range 44E of the glass coat layer 44 of the housing tube 30.

A holding mat 42 is installed at the outer periphery of the first cylindrical tube portion 40A of the downstream tube 40. The downstream tube 40 is held by the holding mat 42 in a state of being accommodated within the tube body 28. In the same way as the holding mat 26, the holding mat 42 is formed in a fibrous form that is insulating and has a predetermined elasticity from, for example, an alumina mat, a resin mat, ceramic wool, Interam mat, mullite, or the like.

As shown in FIG. 1, an oxygen concentration sensor 46 and a second catalyst support 48 are provided, in that order from the upstream side, within the downstream tube body 28B. The oxygen concentration sensor 46 senses the concentration of oxygen within the exhaust, and sends data to an unillustrated control device. From this data and the state of the engine and the like, the control device carries out, for example, adjusting of the electric power that is supplied to the catalyst support 14.

For example, a catalyst that is the same as that of the catalyst support 14, or yet another catalyst, is accommodated at the second catalyst support 48. Further, components within the exhaust that were not treated at the upstream catalytic converter 18 can be purified by the catalyst of the second catalyst support 48. Note that the second catalyst support 48 is structured of a material that is insulating, and is not a structure whose temperature rises by being energized.

A holding mat 50 is installed at the outer periphery of the second catalyst support 48. The second catalyst support 48 is held by the holding mat 50 in a state of being accommodated within the downstream tube body 28B.

In the same way as the holding mats 26, 42, the holding mat 50 is formed in a fibrous form that is insulating and has a predetermined elasticity from, for example, an alumina mat, a resin mat, ceramic wool, Interam mat, mullite, or the like. The holding mats 26, 42, 50 may be the same material, or may be respectively different materials.

Operation of the catalytic converter 12 of the present embodiment is described next.

As shown in FIG. 1, at the catalytic converter 12, the tube body 28 is mounted midway along the exhaust pipe 10 (between the upstream side exhaust pipe 10A and the downstream side exhaust pipe 10B) so as to be concentric with the exhaust pipe 10. When exhaust passes-through the interior of the catalyst support 14, substances within the exhaust (hydrocarbons) and the like within the exhaust are purified by the catalyst that is supported by the catalyst support 14.

In the catalytic converter 12 of the present embodiment, due to the catalyst support 14 being energized by the terminals 18A, 18B and the electrodes 16A, 16B, and the catalyst support 14 being heated, the temperature of the catalyst supported by the catalyst support 14 is raised, and the catalyst support 14 can be made to exhibit a better purifying action. For example, in a case in which the temperature of the exhaust is low such as immediately after start-up of the engine or the like, by energizing and heating the catalyst support 14 in advance, the purifying performance of the catalyst at the initial stage of engine start-up can be ensured.

The glass coat layer 44 is formed at the inner peripheral surface of the housing tube 30 of the tube body 28, and the insulating ability of the tube body 28 is improved. Accordingly, current leaking to the tube body 28 at the time when the catalyst support 14 is energized is suppressed. Due thereto, the energization amount of the catalyst support 14 is ensured, and the temperature of the catalyst support 14 can be raised effectively.

There are cases in which carbon is contained in the exhaust at times of, for example, low-temperature start-up of the engine or the like. Some of the carbon within the exhaust accumulates as soot on the upstream side reduced diameter portion 32. Here, due to the temperature of the upstream side reduced diameter portion 32 being raised by the heat of the exhaust, the accumulated soot can be combusted (burnt off).

In particular, at the catalytic converter 12 of the present embodiment, the diameter of the upstream side reduced diameter portion 32 is decreased toward the upstream side. Due thereto, a vortex arises in the exhaust that flows at the inner side of the upstream side reduced diameter portion 32, and therefore, it is easy for the upstream side reduced diameter portion 32 to receive heat from the exhaust as compared with a structure whose diameter is not reduced (that is shaped as a cylindrical tube of a constant diameter). Because the temperature of the upstream side reduced diameter portion 32 rises easily, combustion of the carbon that has adhered to the upstream side reduced diameter portion 32 can be promoted.

Further, there are cases in which some of the carbon within the exhaust accumulates as soot at the downstream tube 40 as well. Due to the temperature of the downstream tube 40 being raised by the heat of the exhaust, the accumulated soot can be combusted (burnt off).

In particular, at the catalytic converter 12 of the present embodiment, the downstream side reduced diameter portion 40C is provided at the downstream tube 40 as well. Therefore, the flow velocity of the exhaust at the downstream side reduced diameter portion 40C rises as compared with a downstream tube at which the downstream side reduced diameter portion 40C is not provided (a cylindrical tube shaped member having a constant diameter). Due thereto, because the temperature of the downstream tube 40 rises easily, combustion of the carbon that has adhered to the downstream tube 40 can be promoted.

Further, in the present embodiment, the housing tube 30 and the upstream side reduced diameter portion 32 are structured as an integral member without seams. Thus, the heat capacity is small as compared with a structure in which the housing tube 30 and the upstream side reduced diameter portion 32 are made to be separate bodies. Therefore, the amount of heat that moves from the catalyst support 14 to the housing tube 30 and the upstream side reduced diameter portion 32 is small, and the temperature of the catalyst support 14 can be raised effectively.

In the catalytic converter 12 of the present embodiment, as can be understood from FIG. 2, the maximum diameter portion 32D of the upstream side reduced diameter portion 32, i.e., the region that is nearest to the inner peripheral surface of the housing tube 30, is positioned in the formation range 44E of the glass coat layer 44 at the housing tube 30. Further, as can be understood from FIG. 3, the maximum diameter portion 40D of the downstream tube 40, i.e., the region that is nearest to the inner peripheral surface of the housing tube 30, is positioned in the formation range 44E of the glass coat layer 44 at the housing tube 30. Accordingly, the soot, that has accumulated at the upstream side reduced diameter portion 32 and the downstream tube 40, contacting the housing tube 30 is suppressed. Due thereto, even if the accumulated soot contacts the catalyst support 14 for example, the soot does not contact the housing tube 30, and therefore, decreasing of the electrical resistance (or short circuiting) between the electrodes 16A, 16B due to the soot can be suppressed. For example, even if soot accumulates continuously in the peripheral direction on the inner peripheral surface of the housing tube 30 at the downstream side of the catalyst support 14, short circuiting due to this soot can be suppressed.

Moreover, even in a case in which soot accumulates so as to cover the glass coat layer 44 at the upstream side of the catalyst support 14, the maximum diameter portion 32D of the upstream side reduced diameter portion 32, i.e., the region that is nearest to the inner peripheral surface of the housing tube 30, is positioned in the formation range 44E of the glass coat layer 44 at the housing tube 30. Thus, the soot that covers the glass coat layer 44 can be burned by the heat of the upstream side reduced diameter portion 32.

Similarly, even in a case in which soot accumulates so as to cover the glass coat layer 44 at the downstream side of the catalyst support 14, the maximum diameter portion 40D of the downstream tube 40, i.e., the region that is nearest to the inner peripheral surface of the housing tube 30, is positioned in the range of the glass coat layer 44 at the housing tube 30. Thus, the soot that covers the insulating layer can be burned by the heat of the downstream tube 40. In this way, short circuiting due to soot can be more effectively suppressed by burning the soot that has accumulated so as to cover the glass coat layer 44 at the upstream side and the downstream side of the catalyst support 14.

Figure 4:
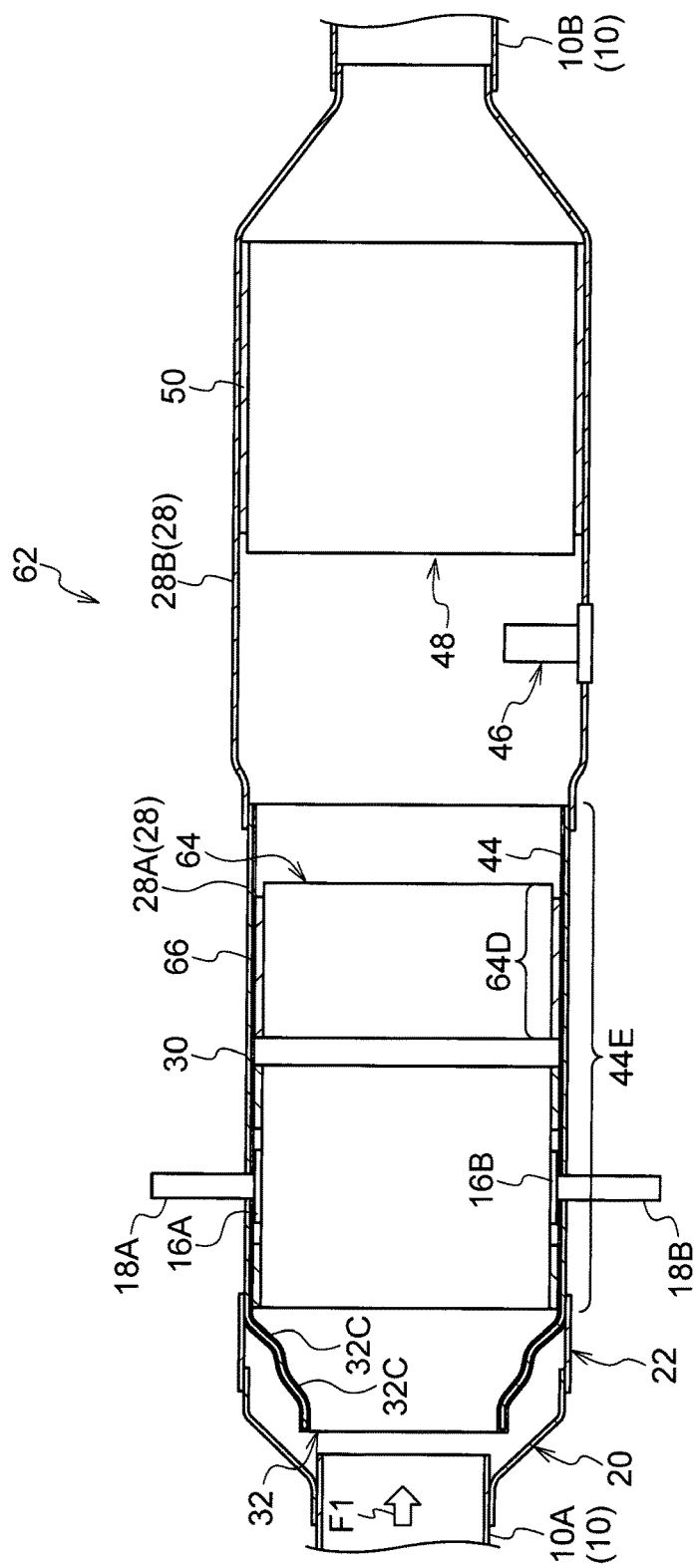
FIG. 4 is a cross-sectional view showing a catalytic converter of a second embodiment of the present invention in a state of being mounted to the exhaust pipe, in a cross-section that includes a center line.

A catalytic converter 62 of a second embodiment of the present invention is illustrated in FIG. 4. In the second embodiment, structural elements, members and the like that are the same as those of the first embodiment are denoted by the same reference numerals, and detailed description thereof is omitted.

In the catalytic converter 62 of the second embodiment, a downstream support 64 is provided instead of the downstream tube 40 of the first embodiment. The downstream support 64 accommodates, for example, a catalyst that is the same as the catalyst of the catalyst support 14 or the second catalyst support 48, or yet another catalyst. Further, components within the exhaust that were not treated by the catalyst of the catalyst support 14 can be purified by the catalyst of the downstream support 64. Note that the downstream support 64 is structured of a material that is insulating, and is not a structure whose temperature rises by being energized.

A holding mat 66 is installed at the outer periphery of the downstream support 64. The downstream support 64 is held by the holding mat 66 in a state of being accommodated within the upstream tube body 28A.

In the same way as the holding mats 26, 42, 50, the holding mat 66 is formed in a fibrous form that is insulating and has a predetermined elasticity from, for example, an alumina mat, a resin mat, ceramic wool, Interam mat, mullite, or the like. The holding mat 66 may be the same material as the holding mats 26, 42, 50, or may be a different material.

Figure 5:
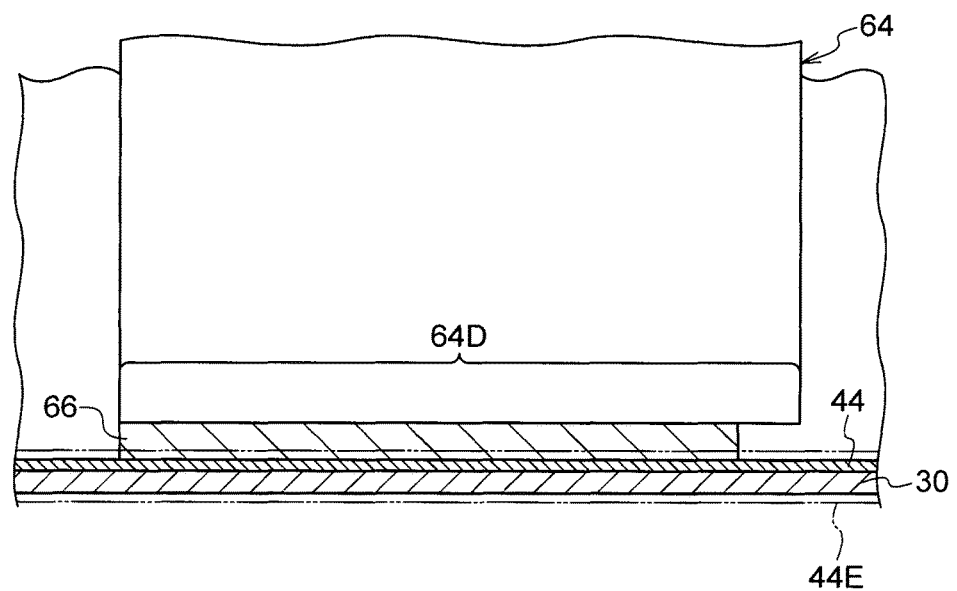
FIG. 5 is a cross-sectional view showing, partially and in an enlarged manner, the catalytic converter of the second embodiment of the present invention.

As shown in FIG. 5, the downstream support 64 is formed in a cylindrical shape on the whole, and the entire outer peripheral surface thereof is a maximum diameter portion 64D. Further, the maximum diameter portion 64D of the downstream support 64, i.e., the region that is nearest to the inner peripheral surface of the housing tube 30, is positioned in the formation range 44E of the glass coat layer 44 of the housing tube 30.

The catalytic converter 62 of the second embodiment as well achieves operation and effects that are similar to those of the catalytic converter 12 of the first embodiment.

Moreover, in the catalytic converter 62 of the second embodiment, the exhaust can be purified further by the catalyst of the catalyst support 64.

Moreover, in the catalytic converter 62 of the second embodiment, the aforementioned short circuiting is suppressed by the glass coat layer 44 of the inner peripheral surface of the housing tube 30, and there is no need to carry out glass coating on the periphery of the downstream support 64. As compared with the housing tube 30 for example, the downstream support 64 does not have a portion that contacts outside air, and therefore, high heat resistance is required of the downstream support 64 as compared with the housing tube 30. The heat resistance of the downstream support 64 increases due to a glass coat layer not being provided thereat.

Further, in the catalytic converter 62 of the second embodiment, the downstream support 64 acts as a heat source. Namely, when heat of the exhaust is applied to the downstream support 64 and the temperature of the downstream support 64 rises, the downstream support 64 retains thermal energy even in a state in which exhaust is not flowing due to, for example, engine stoppage or the like. Further, due to heat of the downstream support 64 being applied to the catalyst support 14, a decrease in the temperature of the catalyst support 14 can be suppressed. Moreover, also at times of re-driving the engine, the catalyst support 14 can be raised to the desired temperature by a lower amount of energized electric power, which can contribute to a reduction in the amount of electric power that is consumed and an improvement in gas mileage.

Moreover, in the second embodiment, reaction heat is generated at the time when the exhaust is purified by the catalyst of the downstream support 64. The temperature of the downstream support 64 is raised by this reaction heat. Due thereto, the effect of burning soot that has accumulated on the downstream support 64 improves more.

The disclosure of Japanese Patent Application No. 2013-269885 filed on Dec. 26, 2013 is incorporated herein by reference in its entirety.

All publications, patent applications, and technical standards mentioned in this specification are herein incorporated by reference to the same extent as if each individual publication, patent application or technical standard was specifically and individually indicated to be incorporated by reference.

The invention claimed is:

1. A catalytic converter comprising:

a tube body that is formed in a tube shape and forms a portion of a flow path of exhaust;

an insulating layer that is provided at an inner surface of the tube body;

a catalyst support that is provided at an interior of the tube body in a range of the insulating layer, and that supports a catalyst for purifying exhaust discharged from an internal combustion engine, and whose temperature is raised due to the catalyst support being energized by electric power;

an upstream side combustion member of which a region, that is nearest to an inner periphery of the tube body, is positioned in the range of the insulating layer and further toward an upstream side of the exhaust than the catalyst support, and that burns soot, within the exhaust, that has adhered to the upstream side combustion member, wherein the upstream side combustion member is an upstream tube that is formed in a tube shape and whose diameter decreases toward an upstream side; and a downstream side combustion member of which a region, that is nearest to the inner periphery of the tube body, is positioned in the range of the insulating layer and further toward a downstream side of the exhaust than the catalyst support, and that burns soot, within the exhaust, that has adhered to the downstream side combustion member, the downstream side combustion member being formed in a tube shape and being a downstream support that adheres to and supports catalytic substances for purifying the exhaust.

2. The catalytic converter of claim 1, wherein the downstream side combustion member has a diameter decreasing toward a downstream side.

* * * * *